J. W. FORRESTER ET AL 2,516,308

VARIABLE SPEED INDUCTION MOTOR SYSTEM

Filed Dec. 26, 1946

INVENTORS
Jay W. Forrester
Robert R. Everett
BY Melvin R. Jenney
ATTORNEY

Patented July 25, 1950

2,516,308

UNITED STATES PATENT OFFICE 2,516,308

VARIABLE SPEED INDUCTION MOTOR SYSTEM

Jay W. Forrester, Anselmo, Nebr., and Robert R. Everett, Cambridge, Mass., assignors, by mesne assignments, to the United States of America Application December 26, 1946, Serial No. 718,530

13 Claims. (Cl. 318—28)

The present invention relates to variable speed induction motor systems and their application to servomechanisms.

A common type of positional servomechanism comprises a polyphase induction motor, usually a two phase motor, in which a fixed reference voltage is applied to one phase and a variable voltage of the same frequency is applied to the other phase. Suitable means are provided, as by synchros, to measure the error between the input and output, and the magnitude of the error is utilized to control the variable motor voltage. Thus when the input and output are approximately in correspondence so that the error is small, the voltage is small and the torque developed by the motor is likewise small. If the error increases the voltage is increased to cause the motor to develop sufficient torque to accelerate the load in such a manner as to tend to bring it into positional correspondence with the input.

This form of control has found some use in low power systems. However, it has many disadvantages which prevent its wide-spread use, especially when high torques are required to drive the load. The motor must be designed to give a wide variation in speed with changes in voltage. This requires that the rotor inductors be of high resistance. Such a motor has an unfavorable control characteristic in that, for any given control voltage, wide variations in speed are possible as a result of changes in load torque. For servo applications it is desirable with a given control signal to have a motor with a steep speed torque characteristic, namely one in which the speed changes only slightly with changes in load torque. Unfortunately the properties which are required to make the motor voltage-dependent are those which provide the unfavorable relation between speed and torque.

One consequence of the undesirable motor characteristic is that phase lags are introduced into the servo system which cause the system to tend toward instability. It is therefore necessary to provide elaborate compensating networks, namely, so-called "derivative networks" which, however, can only partially correct the unfavorable motor characteristics.

Another result of the high rotor resistance is the continuous loss of energy. Since the rotor losses increase with increasing slip, the losses are unduly high at speeds much below synchronous speed. The resultant tendency toward overheating constitutes one of the limitations on the size of the load that can be handled by this type of system.

Because of these disadvantages, the most successful positional controls are either of the direct current or hydraulic type. In both of these types the servo motor can be designed for a satisfactory speed-torque characteristic. For many applications an electrical system and one without motor commutators is desirable.

The foregoing, while directed specifically to induction motor servomechanisms, applies generally to variable speed induction motors. Any induction motor whose speed is varied by changing voltage (or by introducing rotor resistance) has the unfavorable torque-speed characteristics mentioned above.

One object of the present invention is to provide a variable speed alternating current induction motor system having satisfactory operating characteristics for various speeds and loads. Another object is to provide a servomechanism or control system having satisfactory characteristics for various operating conditions.

With these objects in view, one feature of the invention comprises a system in which a polyphase induction motor is operated at a variable frequency. The motor is supplied with voltages which are balanced in magnitude on all phases but variable in frequency, whereby the synchronous speed of the motor is varied. In application to a servomechanism the system comprises means by which the difference between the input and output generates a signal, the frequency of which rather than the magnitude is controlled by the error. For a system of this type it is possible to use a squirrel cage induction motor of the type ordinarily employed for constant speed operation which, as is well known, has a steep speed-torque characteristic.

Further objects of the invention are to provide means for generating the error signal as a function of frequency and for supplying energy to the motor at the frequency determined by the error at any instant. In the accomplishment of these objects the invention makes use of a combination of a fixed frequency oscillator and a variable frequency oscillator, the latter being instantaneously regulated in accordance with the magnitude of the error. This combination comprises a feature of the invention, apart from its utility in servomechanisms. For reasons to be explained later, it is desirable to employ fairly high frequencies. For example, the fixed frequency oscillator may operate at a frequency of 10 kc. and the variable frequency oscillator will operate in a small range near 10 kc. Thus, if the servo motor is to operate at a maximum of 60 cycles, the range of the variable frequency oscillator is between 9.94 and 10.06 kc. The difference frequency is utilized for controlling the power to the motor, preferably through ignition tubes. One advantage of using high frequency oscillators is to minimize transient effects as will be hereinafter described. Under some conditions the difference frequency will be zero and operation of the induction motor at zero frequency involves an important concept which will be explained more fully in the specific description of the apparatus. But it is sufficient to note here that the steep speed-torque characteristic which is obtainable at any frequency is equally important under a low frequency and even zero frequency condition.

Other features of the invention consist of certain novel combinations and arrangements of parts hereinafter described and particularly defined in the claims.

In the accompanying drawings

The invention is herein illustrated and described as embodied in a servomechanism utilizing an induction motor drive.

Figure 1:
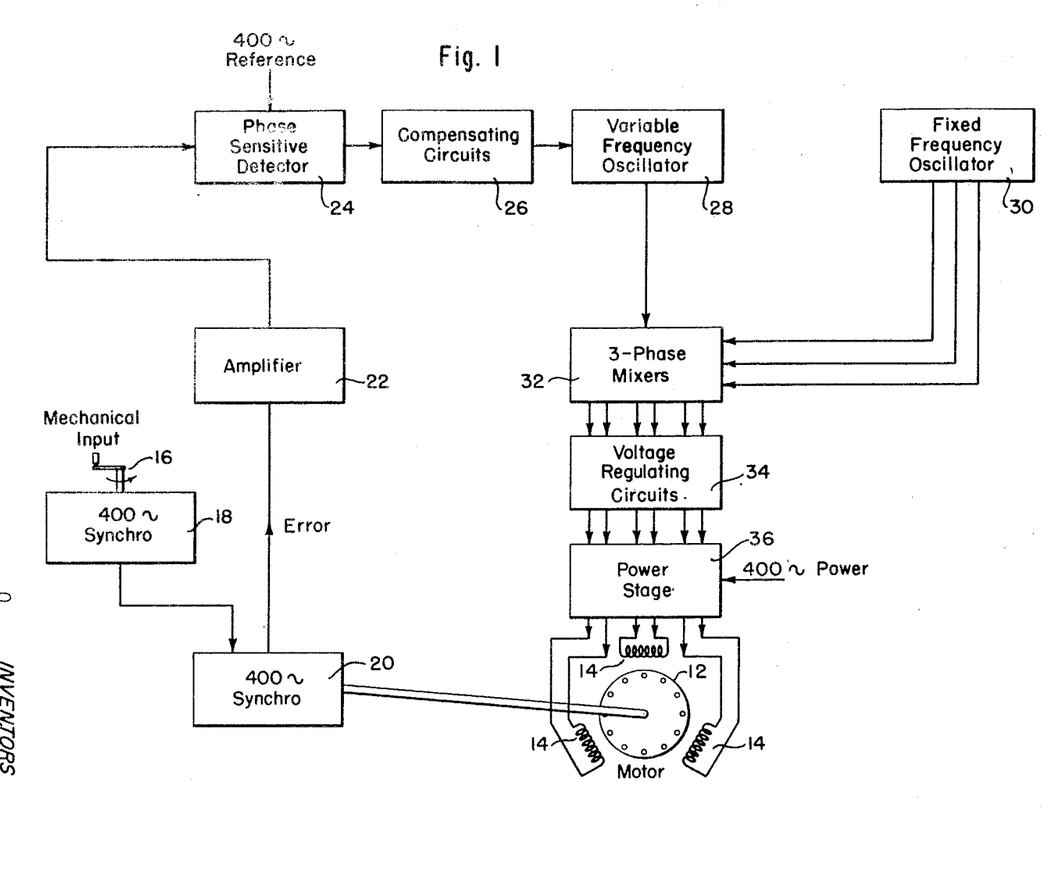
Fig. 1 is a block diagram schematically illustrating a positional control system according to the present invention.

The system generally shown in the block diagram of Fig. 1 comprises a squirrel cage induction motor 12 having independent polyphase windings 14. A 3-phase motor is here shown but a motor with two or any suitable number of phases may be used. The motor is connected to drive a suitable load.

The input to the system is indicated as a crank 16 connected with an input synchro 18. The motor drives an output synchro 20. The synchros and their connections are conventional and are not shown in detail herein. The synchros are here indicated as operating at 400 cycles. As is well known, any instantaneous difference in position between the synchros 18 and 20 results in an "error" signal which is also at 400 cycles and of a magnitude proportional to the angular difference. The error signal is fed to a suitable amplifier 22 and thence to a phase-sensitive detector 24 which will be later described in connection with Fig. 2. The input to the phase sensitive detector is a 400 cycle signal modulated by the instantaneous magnitude of the error. The phase sensitive detector provides a demodulating operation whereby its output is a voltage which is instantaneously proportional to the error itself. This voltage is fed into any suitable compensating networks indicated diagrammatically at 26, preferably to provide lead or integral control, as described in the co-pending applications of Hall, Serial No. 560,184 filed May 12, 1945, now Patent No. 2,496,391, and Serial No. 561,312 filed May 16, 1945, now Patent No. 2,470,099. From the compensating networks the signal is fed to circuits in which the variable-amplitude signal is converted into a signal of variable frequency. These circuits include a variable frequency oscillator 28 and a polyphase fixed frequency oscillator 30. The output frequency of the oscillator 28 is varied in accordance with the magnitude of the signal. As heretofore noted, the frequency variation may be in the range from 9.94 to 10.06 kc. The fixed frequency oscillator 30 generates a polyphase voltage of 10 kc. The outputs of the oscillators 28 and 30 are fed into a three phase mixer 32 in which each phase is similar to the phase-sensitive detector 24. The fixed frequency beats against the variable frequency and a 3-phase voltage of variable low frequency is obtained at the output terminals. The 3-phase output is fed to a voltage regulator 34 which compensates for the varying impedance of the motor at different frequencies and thence to a power stage 36 wherein power is generated at the proper frequency and magnitude to be supplied to the motor. The power stage preferably comprises ignition tubes supplied at a suitable frequency higher than the highest frequency at which the motor is to operate. For example, if the maximum motor frequency is 60 cycles, the power stage may be supplied with power at 400 cycles. The separate output phases of the power stage are connected to the polyphase motor windings 14.

Certain of the components shown schematically in the block diagram are illustrated in greater detail in the succeeding figures and will now be described in detail.

Figure 2:
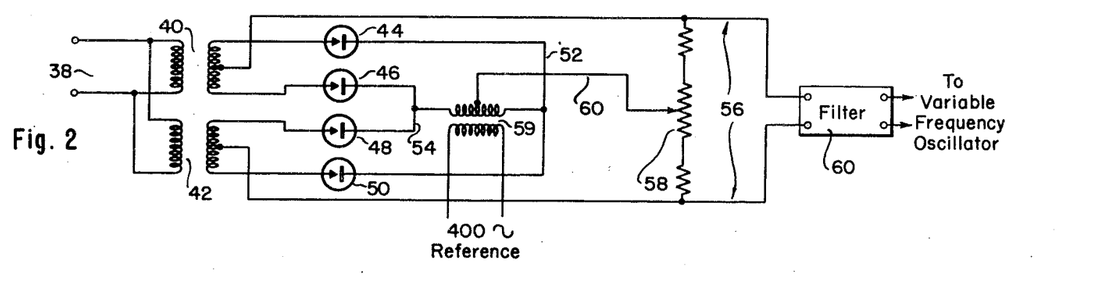
Fig. 2 is a diagram of the phase sensitive detector.

The phase sensitive detector shown in Fig. 2 is of conventional form. The modulated 400 cycle error signal is applied to the terminals 38 connected to transformers 40 and 42, the secondary terminals of which are connected to half wave rectifiers 44, 46, 48 and 50. The rectifiers may be of any suitable form, preferably diodes. The rectifiers 44 and 50 are connected together by the wire 52 and the rectifiers 46 and 48 are connected together by the wire 54. Center taps from the secondaries of transformers 40 and 42 are connected to a line 56 across which is connected a resistor circuit 58. The reference voltage, also at 400 cycles, is fed through a transformer 59, the secondary terminals of which are connected between the junctions 52 and 54. The center of the transformer secondary is connected by a wire 60 with a center tap of the resistor circuit 58 by which the circuit may be adjusted.

The operation of the phase sensitive detector of Fig. 2 is well known and will not be described in detail. It is sufficient to note that the input voltage at 38 is of modulated sinusoidal form and may be represented by the following expression.

$$f(t) \sin \omega t$$

where $\omega$ is the angular frequency corresponding to the 400 cycle synchro frequency herein assumed. $f(t)$ represents the variation in amplitude of the synchro outputs and depends at any instant upon the difference in angular position between the input and the output. The reference voltage may be represented as $\sin \omega t$. Due to the action of the detector circuit the voltage at the terminals of the resistor circuit 58 is the product of the above expressions, namely $$f(t) \sin^2 \omega t = \tfrac{1}{2} f(t) (1 - \cos 2\omega t)$$

The double frequency term is filtered out by a ripple filter 60 so that the output of the filter is a voltage which is simply proportional to $f(t)$. This voltage is fed to the variable frequency oscillator which is shown in Fig. 3.

Figure 3:
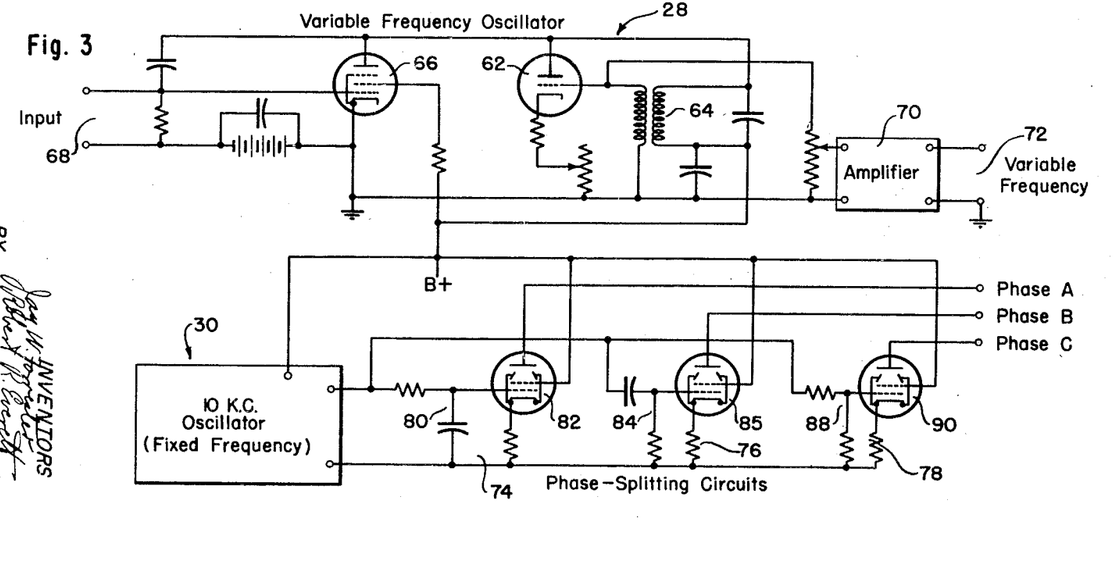
Fig. 3 is a diagram of the oscillator circuits.

Fig. 3 shows the variable frequency oscillator 28, and the fixed frequency oscillator 30. The variable frequency oscillator comprises a tube 62 associated with a resonant circuit 64. A tube 66 which may be termed a reactance tube has its plate and cathode connected across the resonant circuit. The output of the phase-sensitive detector is fed to the input terminals 68 of the variable frequency oscillator circuit. The circuit is not described in detail and it suffices to note that the plate circuit of the tube 66 constitutes a variable reactance across the resonant circuit 64. With zero voltage on the input 68 the tube 62 oscillates at a frequency determined by the characteristics of the circuit 64 in parallel with reactance tube 66. A positive or negative potential difference applied at 68 has the effect of changing the plate circuit reactance of the tube 66 in parallel with the resonant circuit 64 which changes the resonant frequency. The change in resonant frequency is substantially proportional to the magnitude of the voltage impressed at 68. The circuit is preferably so designed that the normal resonant frequency of the oscillator is 10 kc., and the frequency is varied to provide a frequency-modulated output within the range of 9.94 to 10.06 kc. The output of the tube 62 which is at constant voltage is fed through an amplifier 70 to the variable frequency terminals 72.

The fixed frequency oscillator 30 is of any suitable type to generate a frequency corresponding to the normal frequency of the tube 62. The output of the oscillator 30 is fed to three phase splitting circuits 74, 76 and 78. Each phase splitting circuit comprises a phase shifting network and an amplifier tube. Thus the circuit 74 comprises a resistance-capacitance input circuit 80 to produce a phase shift of $+60$ degrees and a tube 82, the plate circuit of which is connected to the output terminal designated phase A. The second phase splitting circuit has a resistance capacitance input network 84 to shift the phase by $-60$ degrees and a tube 85 whose plate circuit is connected to the phase B terminal. The circuit 78 has a simple resistive input 88 for a tube 90 whose plate is connected to the phase C output. Accordingly there appear at the output terminals a three phase voltage in which two of the phases are shifted by $+60$ degrees from the third phase. In subsequent connections the third phase is reversed whereby a three phase voltage with 120 degrees separation is obtained. The elements of circuits 80, 84 and 88 are adjusted for substantially equal voltage magnitudes.

Figure 4:
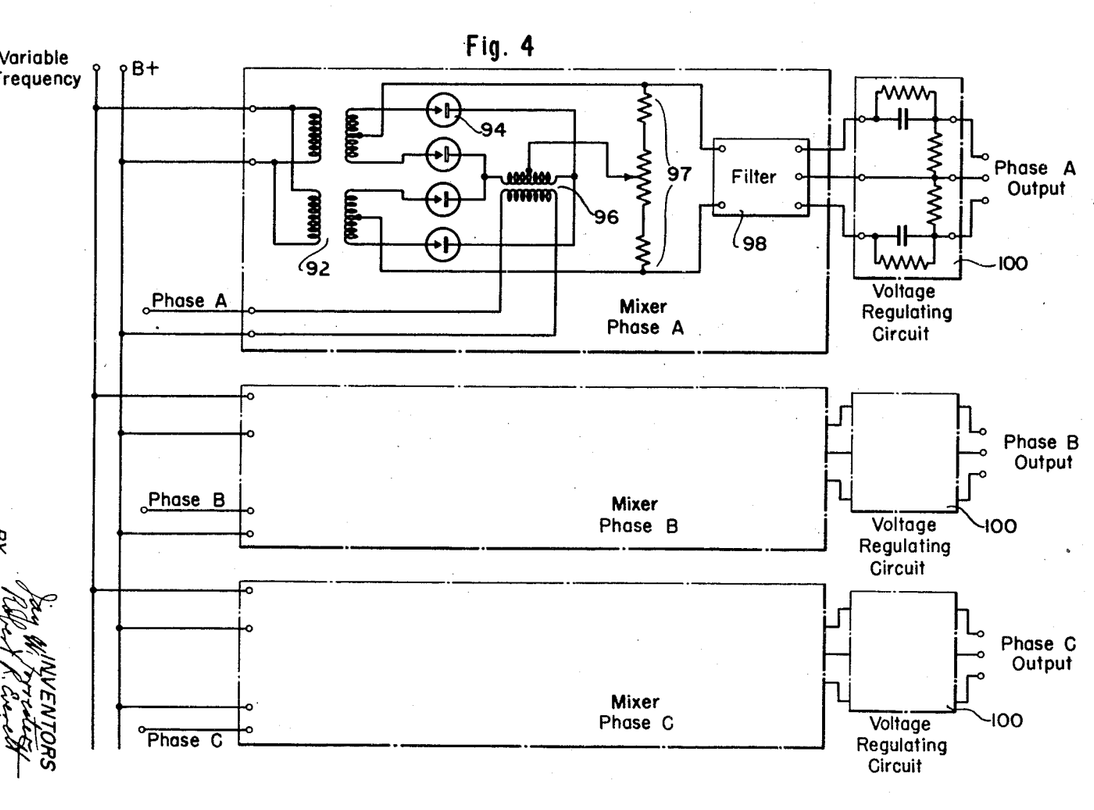
Fig. 4 is a diagram of the mixer circuits.

The variable frequency output from terminal 72 and the three phase output from the phase splitting circuit are fed to the three-phase mixer 32 which is shown in Fig. 4. Each phase of the mixer is identical in principle with the phase-sensitive detector of Fig. 2. Only one of the mixers is shown in detail in Fig. 4, namely for phase A. The variable frequency is fed to the transformers 92 and thence to the rectifier tubes 94. The fixed frequency is supplied to the transformer 96; thus the fixed frequency is fed into the same point as the reference voltage in Fig. 2. The resultant voltage appears at the terminals 97. The mixers for phases B and C are identical with that for phase A except that it will be noted from Fig. 4 that the input for phase C has been reversed in order to give the 120 degree phase displacement between the three phases, as heretofore mentioned.

The outputs of the several phases constitute a three-phase voltage in which the phase relation is the same as that for the three-phase oscillator. Thus if the fixed frequency oscillator operates at 10,000 cycles per second to give a balanced three-phase voltage at its terminals and if the variable frequency oscillator at any instant is operating at 10,010 cycles, for example, the outputs of the mixers constitute a three-phase system at 10 cycles per second in which the same 120 degree phase angle is maintained as in the high frequency oscillator. To show this generally let the voltage supplied to transformer 96 of any phase be represented by the following expression:

$$\sin(\omega_0 t + \theta)$$

and the voltage of the variable frequency supplied through transformers 92 be represented by $$\sin \omega_1 t$$

The output of the mixer is represented by the product of these two expressions which equals $$\tfrac{1}{2}\cos[(\omega_0 - \omega_1)t + \theta] - \tfrac{1}{2}\cos[(\omega_0 + \omega_1)t + \theta]$$

The second cosine term in the above expression represents a frequency approximately twice the generated frequency, namely about 20,000 cycles per second, which is filtered out in the filter 98. The first cosine term represents a difference frequency which may be expressed as follows:

$$\tfrac{1}{2}\cos(\omega_d t + \theta)$$

wherein the specific example assumed above $\omega_d$ stands for a frequency of 10 cycles per second. It will be noted that the same phase angle $\theta$ which appears in the expression for the high frequency appears in the expression for the difference frequency. Therefore if the three-phase input to the mixers comprises voltages which are 120° apart the same phase difference of 120° will appear in the low-frequency three-phase output.

Although the oscillators have been described as oscillating in the vicinity of 10 kc., it will be understood that no particular frequency is critical. It is desirable, however, to use a fairly high frequency in order that transient effects in the oscillator may die out quickly.

In any oscillating system the duration of a transient is measured by the number of cycles over which it extends. A transient effect will occur at each change of frequency of the variable frequency oscillator occasioned by any change of voltage at the input 68 of Fig. 3. The time constants of the oscillator circuit may be readily adjusted so that transient effects may be considered to decay to negligible values within a few cycles, say 5 or 10 cycles. Any such transient therefore is of negligible duration for the low difference frequency which may have a maximum of 60 cycles per second.

Another reason for using a relatively high oscillator frequency is that there is a wide separation between the sum and difference frequencies; in this example, $\omega_0 + \omega_1$ is about 20,000, while $\omega_0 - \omega_1$ may have a maximum of about 60. Therefore, the filter 98 for suppressing the high frequency may be of simple construction.

The output of each of the filters 98 is passed through a voltage regulating circuit 100. The circuits 100 for the three-phases are identical. Their purpose is to adjust the voltage in accordance with the varying impedance of the motor at different frequencies; stated in another way, the motor preferably operates at a nearly constant flux density, which requires that the voltage be reduced as the frequency is reduced. The motor has a high impedance at its maximum frequency (60 cycles) and a correspondingly lower impedance at lower frequencies. It has been found that a simple high pass filter is suitable for voltage regulation. As shown in Fig. 4 the filter comprises a symmetrical network having a center terminal in order that a push-pull output can be obtained. Each side of the filter comprises a resistance-capacitance network of conventional form to attenuate the lower frequencies. The circuit is so designed that the voltage at zero frequency is that necessary to maintain normal motor flux density. Each phase, as shown in Fig. 4, is brought out to three output terminals.

The output voltage of each phase is therefore a voltage of a frequency dependent on the angular difference between the input and output of the servo system. The voltage amplitude would be substantially constant at all frequencies except for the effect of the voltage regulating circuits 100. These three-phase voltages might be supplied directly to a three-phase motor except that the power requirements are ordinarily too severe for the power available at the output terminals of the apparatus shown in Fig. 4; therefore the three-phase output is used to control the supply of power through the power stage 36 to the motor.

Figures 5, 6, 7:
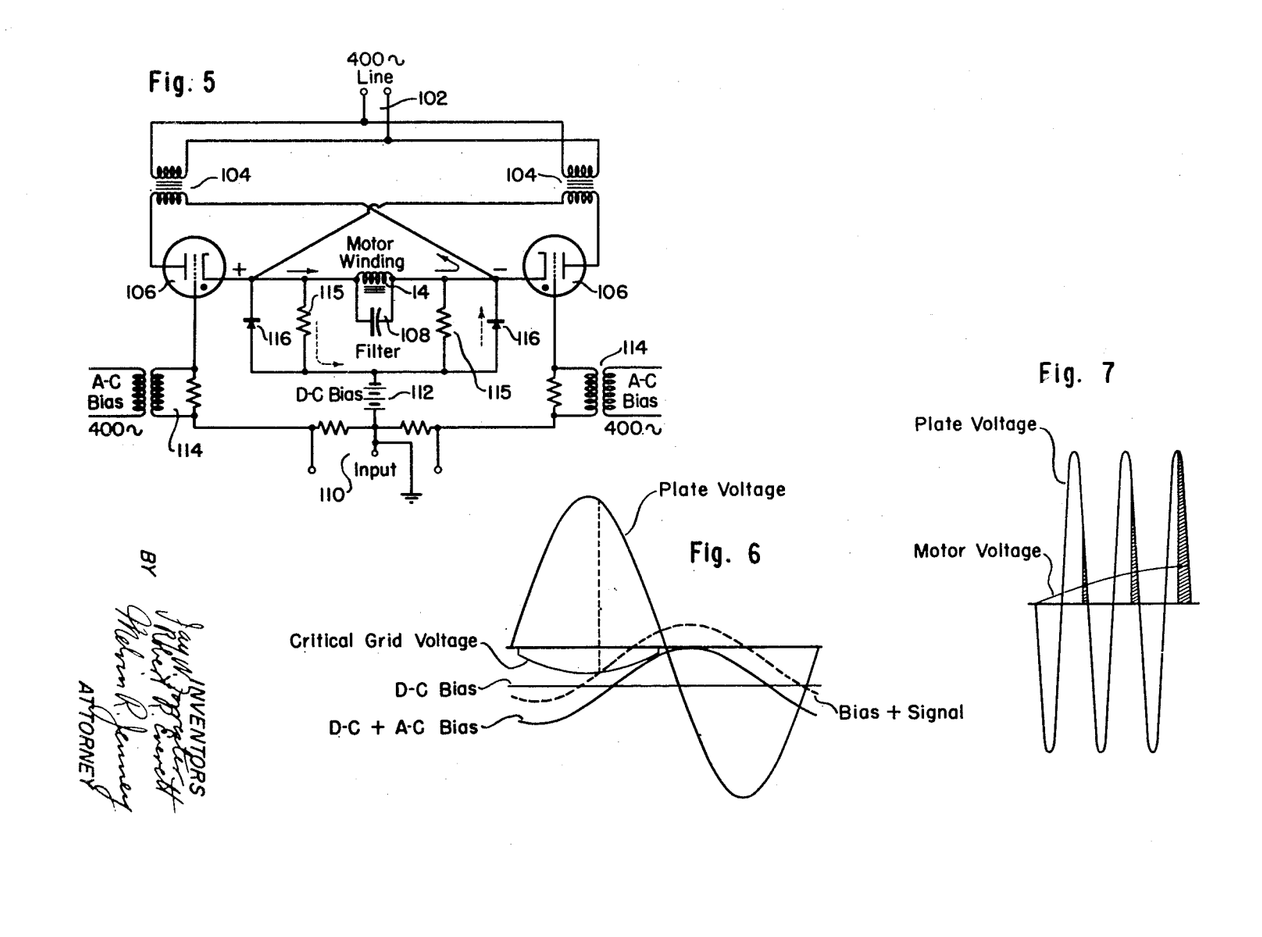
Fig. 5 is a diagram of the power stage.
Figs. 6 and 7 are diagrams illustrating the operation of the power stage.

Only one phase of the power stage is shown in Fig. 5, and the other two phases are of identical form. The primary power supply to the power stage comprises a single phase supply at a frequency considerably higher than the maximum frequency at which the motor is to operate. As heretofore noted for a motor operating at a 60 cycle maximum the power supply may be at 400 cycles. The power supply is indicated at 102 which is fed through transformers 104 to the anode circuits of grid-controlled gas ignition tubes (such as thyratrons) 106. The cathodes of the tubes are connected to one phase of the motor winding 14 across which is connected a filter condenser 108. The three-terminal output of one phase of Fig. 4 is connected to the input terminals of the power stage shown at 110. The voltage introduced at 110 is applied to the grids of the tubes 106 together with a direct current bias 112 and an alternating current bias applied through transformers 114. Resistors 115 and shunting rectifiers 116 are connected between the D. C. bias means and the cathodes for a purpose to be presently explained.

The firing conditions for one tube are illustrated in Fig. 6, in which a complete cycle of the 400 cycle plate voltage is represented. Also shown in this diagram are the D. C. bias and the combined D. C. and A. C. bias voltages. The critical grid voltage is indicated by a loop below the positive half cycle of the plate voltage and represents the grid voltage at which the tube will fire whenever the plate voltage is positive. The combined bias voltages are adjusted so that their graph just fails to intersect the graph of critical grid voltage when no signal is present. However, when a positive signal is superposed on the combined bias voltages as indicated by the dotted line, the critical grid voltage is reached and the tube is caused to fire. The firing point is determined by the point of intersection of the dotted graph with the critical grid voltage and this point is determined by the magnitude of the signal voltage.

The effect of applying a low frequency sinusoidal signal voltage is illustrated by Fig. 7 in which several complete cycles of the 400 cycle plate voltage are shown. Since the signal voltage varies it causes the tube to fire at different points of successive positive half-cycles of the plate supply. The energy available for the motor winding is represented by the hatched portions of the successive positive loops. The output of the tube is filtered by the filter 108 and the motor voltage is therefore represented by the low frequency curve of Fig. 7.

Fig. 7 shows the conditions during one half-cycle of the signal voltage. One of the tubes 106, say the left-hand tube of Fig. 5, ignites at the times indicated by the hatched portions. For the next half-cycle of signal voltage, the other tube 106 ignites, so that current is fed to the motor in the opposite direction. Thus the motor is supplied with power at the signal frequency.

The current flows during the first mentioned half cycle are shown in Fig. 5. The motor current flows as indicated by the solid arrows. A current also flows through the left resistor 115 and the right rectifier 116 as indicated by the dash lines. Since the rectifier provides a low-resistance path, the right-hand side of the motor winding is effectively tied to ground, as is necessary for the cathode-follower action. In the next half cycle the left side of the motor winding is tied to ground. The rectifiers might be omitted, in which case a center tap on the motor winding would be connected to the negative end of the D. C. bias 112, but the disadvantage is that half the load voltage would then be connected to the cathode of the non-firing tube. It will be understood that the intermittent firing of tubes through an inductive circuit results in some rather severe inductive kicks which tend to ignite the non-firing tube, and its tendency to fire would be increased by such a connection. By tying one end of the winding and the cathode of the non-firing tube to ground through a rectifier, the non-firing tube cannot assume any potential condition which will cause it to ignite improperly.

The circuit of Fig. 5 satisfies some rather rigid requirements. Since the motor is to operate over a range of forward and reverse speeds, including zero speed, the power stage must pass direct current, which rules out any transformer coupling between the tubes and load. The cathode-follower arrangement is capable of supplying large currents at moderate voltages; thus a favorable match is provided with the fairly low impedance of the motor windings.

Since the power stage 36 has three phases, it therefore supplies to the motor windings a three-phase voltage proportional to the output 100 and at a sufficient power level for operation of the motor.

Figure 8:
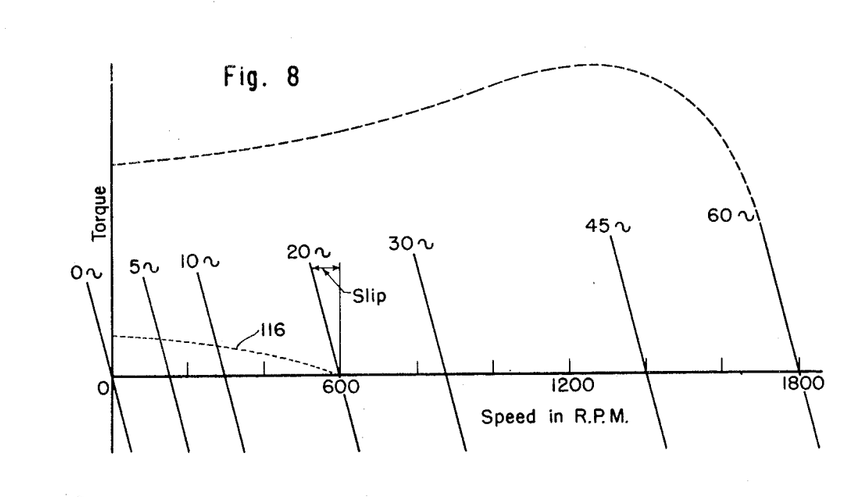
Fig. 8 is a graph illustrating the speed torque characteristics of the motor and Fig. 9 is a diagram showing operation of a motor at zero frequency.

The motor characteristics are shown in Fig. 8. These are similar to the characteristics of an ordinary polyphase motor having a low-resistance squirrel cage rotor and of the type usually employed for power applications. Thus with a four pole motor and a 60 cycle supply having a synchronous speed of 1800 R. P. M. the relation between speed and torque is given by the extreme right hand curve. The portion of the curve which is of particular interest in the present invention is that shown by the full line. The curve is however extended back to zero speed as indicated by the broken line to illustrate the similarity to the familiar induction motor characteristic.

Similar characteristics for 45, 30, 20, 10, 5 and 0 cycles are also shown in Fig. 8. The principal feature of all of these curves is that, as a consequence of the low rotor resistance, they have a very high slope, which means that at any impressed frequency a considerable torque is generated for a relatively small slip. Moreover, within the significant range the relation between torque and speed is substantially linear. The representative value of the slip is indicated for the 20 cycle graph. The characteristics for the different frequencies have a substantially uniform slope so that the linear portion of the characteristic for any frequency is approximately that which would be obtained by sliding the entire 60-cycle graph to the left. In the plotting of these characteristics it is assumed that the impressed voltage is such as to cause operation of the motor at a nearly uniform and optimum flux density.

A dotted graph 116 is also included in Fig. 8. This is the speed-torque characteristic of a typical servo motor intended to be operated at fixed frequency and variable voltage. Such a motor must be built with a high resistance rotor in order that its speed may be dependent upon voltage. Thus the curve 116 is the speed-torque characteristic for a 4 pole 60 cycle motor in which the voltage has been reduced to such a value that the motor will develop zero torque at 600 R. P. M. The speed-torque characteristic is very flat which follows as a consequence of the high resistance of the rotor and its operation at a fraction of synchronous speed. This means that a slight change of torque must be accompanied by a large change of speed, and the servo operation is accordingly unsatisfactory. The ideal characteristics would be those in which the graphs are straight vertical lines, and this condition is approximated as closely as possible in the present invention by the use of an induction motor of low rotor resistance operating at variable frequency.

Figure 9:
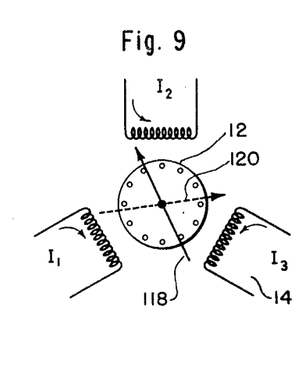

It will be observed that one of the characteristics is drawn for zero frequency. The concept of an induction motor operating at zero frequency requires some explanation. At zero frequency, namely direct current, the three windings 14 of the motor carry currents designated $I_1$, $I_2$ and $I_3$ in Fig. 9. In general the magnitudes of the three currents are unequal but their effect is to produce a direct current flux through the rotor, the axis of which may be represented by the solid arrow 118. For a different relation of current magnitudes in the three windings the magnetic flux axis may be represented by another arrow, such as the dotted arrow 120. The arrow represents the angular position of the magnetic field direction so long as direct current is applied to the windings. Thus the motor with direct current forms a dynamic brake. If the rotor is rotating when the windings are energized at zero frequency the braking torque is represented by the torque-speed characteristic of Fig. 8 for zero frequency. The zero frequency condition arises in practice when the mechanical input 16 is brought to rest. The motor windings will ultimately be energized at zero frequency to hold the motor at rest in the position dictated by the position of the mechanical input.

A brief review of the operation of the system will now be given. If the input 16 is rotated or oscillated in any manner the motor will be operated to follow the input. If any angular displacement between the input and the motor exists at any time an error voltage will appear at the synchro output. In the illustrated embodiment of the invention this error voltage is of constant frequency and of an amplitude proportional to the instantaneous angular error. The invention provides means whereby the error signal is converted to a frequency modulated signal, namely one in which the frequency of the power supplied to the motor is proportional to the instantaneous value of the error. This is accomplished by means of two high frequency oscillators, one operating at fixed frequency and the other at variable frequency, the outputs of which are caused to beat and thereby produce a low frequency signal which is supplied through the power stage to the motor. It will be understood, however, that the principal feature of the present invention resides in the use of a frequency modulated signal for operation of the motor whereby improved motor characteristics may be utilized and that this feature of the invention is not to be considered as limited to the particular means by which the variable frequency supply to the motor is obtained.

Although the invention has been described as embodied in a servomechanism, it will be understood that the variable speed motor system may be used, if desired, for any purpose. Thus a variable speed motor system may comprise the variable frequency oscillator, the power stage, and the motor. The motor may then be designed for optimum speed-torque characteristics. The system will operate at lower speed with favorable motor characteristics, as distinguished from the unfavorable characteristics obtained when motor speed is varied by varying the voltage or introducing resistance into the rotor circuit.

Having thus described the invention, we claim:

1. A variable speed polyphase induction motor control system comprising, a generator for high-frequency polyphase oscillations, a generator for high-frequency single-phase oscillations, one of said generators operating at a fixed frequency and the other at a frequency which is variable but near said fixed frequency, and a heterodyne mixer for beating single-phase oscillations against the separate phases of the polyphase oscillations to obtain polyphase difference-frequency oscillations, source of power for supplying energy to the motor and means applying said polyphase difference frequency oscillations to said source to control the flow of energy to said motor at said difference frequency.

2. A variable speed polyphase induction motor control system comprising, a generator for high-frequency polyphase oscillations, a generator for high-frequency single-phase oscillations, one of said generators operating at a fixed frequency and the other at a frequency which is variable but near said fixed frequency, a heterodyne mixer for beating single-phase oscillations against the separate phases of the polyphase oscillations to obtain polyphase difference-frequency oscillations, a power stage including grid controlled gas tubes for supplying energy to the motor, and input connections for applying said polyphase difference frequency oscillations to bias said tubes thereby controlling the flow of energy to said motor at said difference frequency.

3. A controlled frequency power unit comprising two grid-controlled gas tubes, each having an anode and a cathode, the tubes being connected to push-pull relationship, means for supplying voltage at high frequency to the anodes, means for impressing on the grids a bias voltage including at least a direct current voltage component and an alternating current component at the same frequency as that supplied to the anodes and of a magnitude such that the tubes are non-conductive, a source of control voltage, means for impressing said control voltage at lower frequency to bias the grids of said grid-controlled tubes, and means for connecting a load between the tubes.

4. A servomechanism for controlling the angular position of an output shaft in response to the angular position of an input shaft comprising a polyphase induction motor adapted to drive said output shaft, means to generate an error signal varying as a function of the difference of said angular positions, means to convert said error signal to a signal whose frequency varies as a function of said difference of angular position, a source of polyphase energy, and means for applying energy from said source to drive said motor in response to said variable frequency signal.

5. A servomechanism for controlling the angular position of an output shaft in response to the angular position of an input shaft comprising a polyphase induction motor adapted to drive said output shaft, means to generate an error signal varying in magnitude and phase as a function respectively of the magnitude and direction of the difference of said angular positions, a source of reference alternating voltage, a phase sensitive detector responsive to the phase of said reference voltage from said source and the phase and amplitude of said error signal to produce an output voltage varying in amplitude and polarity as a function of said error signal, a variable frequency generator, means applying said output voltage to control the frequency of said generator output, a polyphase constant frequency generator, means for heterodyning the output of said variable frequency generator with each output phase of said fixed frequency generator to obtain a difference frequency polyphase signal whose frequency and phase is a function respectively of said magnitude and direction of said angular difference, and means applying said polyphase beat frequency signal to energize said motor.

6. A servomechanism for controlling the angular position of an output shaft in response to the angular position of an input shaft comprising a polyphase induction motor adapted to drive said output shaft, means to generate an error signal varying as a function of the difference of said angular positions, means to convert said error signal to a signal whose frequency varies as a function of said difference of angular position, a source of polyphase energy, and means including grid-controlled gas tubes for applying energy from said source to said motor in response to said variable frequency signal.

7. A servomechanism for controlling the angular position of an output shaft in response to the angular position of an input shaft comprising a polyphase induction motor adapted to drive said output shaft, a self-synchronous electrical data transmission system mechanically coupled to said input shaft and said output shaft for deriving an alternating current error voltage output having phase and amplitude varying as a function respectively of the direction and magnitude of the difference in the angular position of said input shaft and the angular position of said output shaft, a variable high frequency generator, means to control the frequency of said generator in response to said error voltage, a constant frequency polyphase generator, a heterodyne mixer responsive to the output of said variable frequency generator and each output phase of said polyphase generator to derive a difference frequency polyphase output whose frequency and phase vary as a function respectively of the magnitude and direction of said angular difference, a source of energy, and means responsive to said mixer output to apply power from said source to said motor.

8. A servomechanism for controlling the angular position of an output shaft in response to the angular position of an input shaft comprising a polyphase induction motor adapted to drive said output shaft, a self-synchronous electrical data transmission system mechanically coupled to said input and output shafts for deriving an alternating current error voltage output having phase and amplitude varying as a function respectively of the direction and magnitude of the difference in the angular positions of said input and output shafts, a variable high frequency generator, means to control the frequency of said generator in response to said error voltage, a constant high frequency polyphase generator, a heterodyne mixer responsive to the output of said variable frequency generator and each output phase of said polyphase generator to produce a difference frequency polyphase output whose frequency and phase vary as a function respectively of the magnitude and direction of said angular difference, a power stage adapted to supply power to energize said motor, and means for applying said polyphase difference frequency to said power stage to supply polyphase power at said difference frequency to energize said motor.

9. A servomechanism for controlling the angular position of an output shaft in response to the angular position of an input shaft comprising a self-synchronous electrical data transmission system mechanically coupled to said input and output shafts for producing an alternating current error voltage output having phase and amplitude varying as a function respectively of the direction and magnitude of the difference of the angular positions of said input and output shafts, an alternating current reference source, a phase sensitive detector responsive to the phase of said reference source and the phase and amplitude of said error voltage to produce an output voltage varying in polarity and amplitude as a function respectively of the phase and amplitude of said error voltage, a polyphase constant frequency generator, a variable frequency generator, means applying the output voltage of said detector to control the frequency of said variable frequency generator so that the two generators have the same frequency at zero error voltage, a mixer circuit or heterodyning the output of said variable frequency generator and each output phase of said polyphase generator to derive a difference frequency polyphase output signal whose phase and frequency vary as a function respectively of the direction and magnitude of said angular difference, a power stage including grid-controlled gas tubes adapted to supply power to energize said motor, and means for applying said polyphase difference frequency signal to said power stage to energize said motor at said difference frequency.

10. A controlled frequency power unit for supplying power to a load in response to an input low frequency control signal, comprising two grid-controlled gas tubes, each having an anode and a cathode, the tubes being connected in push-pull relationship, means for supplying voltage at a high frequency to said anodes, an input circuit for applying said control signal to bias said tubes, means for biasing said tubes to be normally nonconducting in the absence of said control signal, a load impedance connected between the cathodes of said tubes, and rectifier means connected between said cathodes and said input circuit, said rectifier means operating upon conduction of one of said tubes to connect the cathode of the nonconducting tube and hence one terminal of said load impedance to said input circuit.

11. A controlled frequency power unit for supplying power to a load in response to an input low frequency control signal comprising two grid-controlled gas tubes, each having an anode and a cathode, means for supplying voltage at high frequency to said anodes, an input circuit for applying said control signal to bias said tubes, means for impressing on said grids a bias voltage including at least a direct current voltage component and an alternating current voltage component having the same frequency as that supplied to said anodes and of a magnitude such that said tubes are nonconductive in the absence of said control signal, a load impedance connected between the cathodes of said tubes, and rectifier means connected between said cathodes and said input circuit, said rectifier means operating upon the conduction of one of said tubes to connect the cathode of the nonconducting tube and hence one terminal of said load impedance to said input circuit.

12. A servomechanism for controlling the angular position of an output shaft in response to the angular position of an input shaft, comprising, a polyphase induction motor adapted to drive said output shaft, means to generate an error signal varying in magnitude and phase with the magnitude and direction respectively of the difference of said angular positions, means to convert said error signal to a signal whose frequency and phase vary with the magnitude and direction respectively of said difference of angular positions, a source of polyphase energy, and means for applying energy from said source to drive said motor in response to said variable frequency signal.

13. A servomechanism for controlling the angular position of an output shaft in response to the angular position of an input shaft, comprising, a polyphase induction motor adapted to drive said output shaft, means to generate an error signal varying in magnitude and phase with the magnitude and direction respectively of the difference of said angular positions, means to convert said error signal to a signal whose frequency and phase vary with the magnitude and direction respectively of said difference of angular positions, a source of polyphase energy, means to heterodyne said variable frequency signal with each phase of said polyphase source to obtain a difference frequency polyphase signal whose frequency and phase vary as the magnitude and direction respectively of said angular difference, and means applying said polyphase difference frequency signal to energize said motor.

JAY W. FORRESTER.
ROBERT R. EVERETT.

REFERENCES CITED

The following references are of record in the file of this patent:

UNITED STATES PATENTS

| Number | Name | Date |
| --- | --- | --- |
| 1,643,405 | Duncan | Sept. 27, 1927 |
| 1,731,264 | Potter | Oct. 15, 1929 |
| 1,898,366 | Lewis | Feb. 21, 1933 |
| 1,934,400 | Bollman | Nov. 7, 1933 |
| 2,221,517 | Holters | Nov. 12, 1940 |
| 2,290,657 | Vedder | July 21, 1942 |
| 2,303,654 | Newton | Dec. 1, 1942 |
| 2,320,491 | Vedder | June 1, 1943 |
| 2,340,875 | Gibbs | Feb. 8, 1944 |
| 2,379,689 | Crosby | July 3, 1945 |
| 2,385,641 | Peterson | Sept. 25, 1945 |
| 2,404,344 | Wild | July 16, 1946 |
| 2,430,213 | Da Rosa | Nov. 4, 1947 |
| 2,446,607 | Peterson | Aug. 10, 1948 |
| 2,457,792 | Wild et al. | Dec. 28, 1948 |